United States Patent
McDonald (10) Patent No.: US 11,523,711 B2
(45) Date of Patent: Dec. 13, 2022

(54) MOP WASHING BUCKET

(71) Applicant: Tim McDonald, Missouri City, TX (US)

(72) Inventor: Tim McDonald, Missouri City, TX (US)

( * ) Notice: Subject to any disclaimer, the term of this patent is extended or adjusted under 35 U.S.C. 154(b) by 245 days.

(21) Appl. No.: 16/794,961

(22) Filed: Feb. 19, 2020

(65) Prior Publication Data

US 2021/0251433 A1    Aug. 19, 2021
US 2022/0304521 A9    Sep. 29, 2022

Related U.S. Application Data

(63) Continuation-in-part of application No. 16/381,569, filed on Apr. 11, 2019, now Pat. No. 10,773,279.
(Continued)

(51) Int. Cl.
| | | |
|---|---|---|
| *A47J 47/18* | (2006.01) | |
| *A47L 13/58* | (2006.01) | |
| *A22C 21/00* | (2006.01) | |
| *A22C 25/02* | (2006.01) | |
| *A47L 13/59* | (2006.01) | |
| *B08B 3/04* | (2006.01) | |

(Continued)

(52) U.S. Cl.
CPC .......... *A47J 47/18* (2013.01); *A22C 21/0061* (2013.01); *A22C 25/02* (2013.01); *A47L 13/58* (2013.01); *A47L 13/59* (2013.01); *B08B 3/04* (2013.01); *B08B 3/048* (2013.01); *B08B 3/102* (2013.01); *E03C 1/24* (2013.01)

(58) Field of Classification Search
CPC ...... A47J 47/18; A22C 21/0061; A22C 25/02; A47L 13/58; A47L 13/59; B08B 3/04; B08B 3/048; B08B 3/102; E03C 1/24; A46B 17/06
See application file for complete search history.

(56) References Cited

U.S. PATENT DOCUMENTS 10,773,279 B2 *  9/2020  McDonald ............. A46B 17/06
11,064,842 B2 *  7/2021  McDonald ............. A22C 17/08
(Continued)

OTHER PUBLICATIONS

NPL-1 https://www.amazon.com/Interstate-Pneumatics-FS14-Swivel-Fitting/dp/B00ABYZVQI/ref=sr_1_16?crid=17O7GPZ8VC14U&keywords=swivel%2Bfitting&qid=1662597477&sprefix=swivel%2Bfitting%2B%2Caps%2C102&sr=8-16&th=1 (Year: 2010).*
(Continued)

*Primary Examiner* — Michael E Barr
*Assistant Examiner* — Pallavi Chitta
(74) *Attorney, Agent, or Firm* — Egbert, McDaniel & Swartz, PLLC (57) ABSTRACT

A mop washing bucket has a container with an interior volume defined by a bottom and a wall extending upwardly from the bottom, a fluid inlet affixed adjacent to the bottom of the container, and a fluid outlet formed on the container in a location above the fluid inlet. The fluid inlet is adapted to be connected to a water hose. The fluid inlet extends through the wall of the container so as to have one end in the interior volume of the container and another end exterior of the wall of the container. The fluid outlet is adapted to allow water from the interior volume of the container to flow outwardly of the container.

15 Claims, 3 Drawing Sheets

Related U.S. Application Data which is a continuation-in-part of application No. 16/039,948, filed on Jul. 19, 2018, now Pat. No. 11,134,821, which is a continuation-in-part of application No. 15/993,913, filed on May 31, 2018, now Pat. No. 11,064,842, said application No. 15/993,913 is a continuation-in-part of application No. 14/877,519, filed on Oct. 7, 2015, now Pat. No. 10,456,812, which is a continuation-in-part of application No. 14/812,545, filed on Jul. 29, 2015, now Pat. No. 9,408,412, which is a continuation-in-part of application No. 14/550,195, filed on Nov. 21, 2014, now Pat. No. 9,320,286.

(60) Provisional application No. 62/640,261, filed on Mar. 8, 2018.

(51) Int. Cl.
*B08B 3/10* (2006.01)
*E03C 1/24* (2006.01)

(56) References Cited

U.S. PATENT DOCUMENTS

| | | | |
|---|---|---|---|
| 11,134,821 B2* | 10/2021 | McDonald | A47L 13/59 |
| 2005/0031404 A1* | 2/2005 | Tsai | B60S 3/047 |
| | | | 401/281 |
| 2014/0083471 A1* | 3/2014 | Lian Tangstad | B08B 3/10 |
| | | | 134/184 |
| 2016/0144412 A1* | 5/2016 | McDonald | A22C 17/08 |
| | | | 134/25.3 |
| 2018/0360291 A1* | 12/2018 | McDonald | A22C 25/02 |

OTHER PUBLICATIONS

NPL-2 Anderson Metals Brass Garden Hose Fitting, Connector, 1/2" Barbx3/4" Male Hose Industrial & Scientific>Hydraulics, Pneumatics & Plumbing>Fittings>Hose Fittings>Barbed Fittings (weblink too long) (Year: 2011).*

\* cited by examiner

MOP WASHING BUCKET

CROSS-REFERENCE TO RELATED APPLICATIONS

The present application is a continuation-in-part of U.S. patent application Ser. No. 16/381,569, filed on Apr. 11, 2018 and entitled "Mop Cleaning System and Method for Cleaning a Mop", presently pending. U.S. patent application Ser. No. 16/381,569 is a continuation-in-part of U.S. patent application Ser. No. 16/039,948 filed on Jul. 19, 2018, and entitled "Washing Bucket for Household, Commercial and Industrial Use for Cleaning Mops", presently pending. U.S. patent application Ser. No. 16/039,948 claims priority to U.S. Provisional Application No. 62/640,261, filed Mar. 8, 2018. U.S. patent application Ser. No. 16/039,948 is a continuation-in-part of U.S. patent application Ser. No. 15/993,913, filed on May 31, 2018, and entitled "Washing Bucket for Household, Commercial and Industrial Use for Cleaning Mops and for Chemical Cleaning", presently pending. U.S. application Ser. No. 15/993,913 is a continuation-in-part of U.S. application Ser. No. 14/877,519, filed on Oct. 7, 2015, and entitled "Apparatus and Method for Washing Meat and/or Produce", presently pending. U.S. patent application Ser. No. 14/877,519 is a continuation-in-part of U.S. patent application Ser. No. 14/812,545, filed on Jul. 29, 2015, and entitled "Apparatus and Method for Cleaning Produce". U.S. patent application Ser. No. 14/812,545 issued as U.S. Pat. No. 9,408,412 on Aug. 9, 2016. U.S. patent application Ser. No. 14/812,545 is a continuation-in-part of U.S. patent application Ser. No. 14/550,159, filed on Nov. 21, 2014. U.S. patent application Ser. No. 14/550,195 issued as U.S. Pat. No. 9,320,286 on Apr. 26, 2016, and is entitled "Apparatus and Method for Cleaning Game".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to washing buckets. More particularly, the present invention relates to mop buckets. Additionally, the present invention relates to mop buckets in which a continuous supply of fresh water is provided during the washing and rinsing of the mop. The present invention also relates to relatively small mop washing buckets that can be used without wheels or wringing attachments.

2. Description of Related Art Including Information Disclosed Under 37 CFR 1.97 and 37 CFR 1.98

A mop bucket is used in conjunction with a mop for cleaning floors and the like. At the start of the cleaning process, fluid used for mopping is held within the bucket and is generally clean. However, as the floor is mopped, and the mop is repeatedly dipped into the bucket, the fluid therein becomes less and less clean as dirt and other matter is transferred from the floor to the wet mop and then to the fluid in the bucket. Occasionally, a user may place the mop into a wringer located above the bucket in order to remove fluid from the mop, but again, this merely transfers dirty fluid to the fluid within the bucket.

The problem often encountered with the use of cleaning buckets is that the dirt deposited on the mop bucket liquid collects at the bottom of the container and that turbulence of the liquid, as when rinsing out a mop, washes the dirty water back into the main body of liquid where it may again be absorbed into the mop. The mop then spread the dirt back out on the floor, leaving unsightly streaks and leading to incomplete cleaning. In an attempt to alleviate this problem, the mop bucket has to be repeatedly emptied and cleaned out.

The problem is twofold. First, the there is the difficulty of separating the heavy components, such as dirt or grease attached to the dirt, from cleaner water in the mop bucket. The second difficulty is turbulence within the water caused by the swishing of the mop within the bucket or residual sloshing movement of water after the bucket has been moved. The turbulence tends to disturb soil, sludge and other heavy components of dirty water and evenly distribute them within the body of water to be picked up again when the mop is rinsed in the bucket, even if care is taken up to push the mophead all the way down to the bottom of the bucket.

U.S. patent application Ser. No. 16/381,569 to the present inventor was a great improvement in the field of mop washing buckets. This washing bucket has a container with an interior defined by wall and a bottom, a fluid inlet affixed to the wall of the container and communicating with the interior of the container, and a fluid outlet opening to the wall of the container and positioned at a level higher than a level of the fluid inlet. The fluid inlet is positioned adjacent to the bottom of the container. The fluid inlet has a connector positioned exterior of the wall of the container and which is adapted to connect to a water hose. The fluid outlet has a diameter greater than a diameter of the fluid inlet. The fluid outlet has a pipe affixed to the wall of the container.

In this prior application to the present inventor, the mop washing bucket worked in an excellent fashion for use in relatively moderate to large facilities. However, an issue developed with respect to the use of such a mop bucket in very small facilities, such as small convenience stores, small fast food restaurants, and other commercial operations that operate in a very restricted space. It was found that the mop washing bucket of this prior application, along with conventional prior art mop washing buckets, have a large footprint and occupy a relatively large area. The mere size of prior art mop washing buckets would occupy enough space so as to be a major inconvenience to the day-to-day operations of such small facilities. Additionally, under certain circumstances, the small facilities would have a relatively small sink in the janitorial closet. As such, it would become difficult to actually place such a mop washing bucket, in its entirety, within such a small sink. As such, a need developed so as to provide a relatively small mop washing bucket that occupies a minimal amount of space in small facilities and which can be easily placed in small sinks.

Recently, there has been a trend in the design of apparatus that are used in cleaning surfaces, such as floors and walls. These new devices employ micro-fiber cleaning pads. For example, current designs of floor mops include a mop head having a micro-fiber cleaning pad removably attached to the mop head, whereby the pad can be disposed of or laundered after use. In order that the cleaning pad can be easily removable from the mop head, the mop head is typically designed with clips or other similar types of features. These features removably hold the cleaning pad to the mop head without requiring separate fasteners on the mop head and without requiring the use of tools for attaching and removing the microfiber cleaning pad from the mop head. Under these circumstances, in small facilities, it is desirable to be able to clean such microfiber cleaning pads in a fast, convenient and easy fashion. This is largely preferable over the expense of continuing to replace dirty microfiber cleaning pads. As such, a need has developed so as to provide a mop washing bucket that can effectively clean microfiber pads associated with these types of floor mops.

For example, U.S. Pat. No. 3,630,369 teaches a mop cleaning device wherein a supply of cleaning fluid is circulated through a container. However, relatively heavy particles are separated from the fluid by what appears to be a gravity trap while leaving smaller particles still suspended within the fluid. In another example, U.S. Pat. No. 4,161,799 discloses a mop bucket that treats dirty fluid. However the system leaves undesirable matter within the bucket itself.

In the past, various patterns of issued relating to mop buckets and cleaning systems for mop buckets. For example, U.S. Pat. No. 5,333,353, issued on Aug. 2, 1994 to M. Taylor, teaches a mop wringer that has a long operating handle and mounts on the rear wall of the bucket. When so mounted, the wringer is supported on the sidewalls of the bucket at or toward the front of the wringer by support ledges integrally molded into the sidewalls of the bucket below the lower rim thereof. The ringer engages the bucket in the manner which opposes the tendency for the back of the wringer to lift off of the bucket when operating force is applied to the wringer handle.

U.S. Patent Application Publication No. 2005/0076465, published on Apr. 14, 2005 to B. Rousey, describes a mop bucket filtering system. This mop bucket filtering system includes a mop bucket defining a cleaning solution basin. A pump is externally mounted on the bucket and is in fluid communication with the cleaning solution basin. A filter system is exteriorly mounted on the bucket in fluid communication with the cleaning solution basin and is operationally connected to the pump. The pump draws fluid from the cleaning solution basin through the filter system for return to the basin after the cleaning solution has been filtered.

U.S. Pat. No. 6,000,094, issued on Dec. 14, 1999 to R. S. Young, teaches a removal and replaceable filter and filter holder for a mop cleaning bucket. This filter receives dirt settling under gravity from the contained liquid so that the dirt collects in and passes through the filter so as to be trapped therebelow. The holder is a rigid or substantially rigid perforated support structure spaced above and below the dirt-receiving filter. The holder is supported in the bucket in spaced relation to the bottom of the bucket and protects the filter. The filter is a thin, sturdy, semi-rigid and floatable member with many holes so that soiled water passes through and collects in the bottom of the bucket.

U.S. Pat. No. 5,976,266, issued on Nov. 2, 1999 to Anderson et al., provides a method for cleaning and wringing a mop. The mop is provided with a handle, mop strings and a plunger. The plunger is located between the handle and the mop strings. A sleeve having a top and an open bottom end is provided with the sleeve being perforated near the bottom end. The sleeve is tapered so that the bottom end is larger than the top end. The plunger and the mop strings are located inside the sleeve with the plunger positioned near the top end of the sleeve and the mop strings depending from the plunger. The bottom end of the sleeve is located in a liquid so that the liquid enters a bottom portion of the sleeve through the perforations. The handle is moved down so as to compress the mop strings with the plunger, with the mop strings being immersed in the liquid, so as to force dirt from the mop strings out of the sleeve perforations. The handle is moved up so as to raise the plunger inside the sleeve and decompress the mop strings so as to allow the mop strings to absorb liquid from outside the sleeve to the perforations.

It is an object of the present invention to provide a mop washing bucket that effect effectively cleans the mop strings of a mop.

It is another object of the present invention to provide a mop washing bucket that effectively cleans microfiber pads associated with floor and wall mops.

It is another object of the present invention to provide a mop washing bucket that allows a continuous supply of clean water to be delivered to the mop when the mop strings or microfiber pads are positioned within the bucket.

It is another object of the present invention to provide a mop washing bucket whereby a continuous supply of clean hot water is maintained within the interior of the washing bucket.

It is another object of the present invention to provide a mop washing bucket that effectively discharges debris from the interior of the bucket.

It is another object of the present invention to provide a mop washing bucket that can be adapted for domestic, commercial and industrial uses.

It is still another object of the present invention to provide a mop washing bucket that occupies a minimal amount of space within a facility.

It is another object of the present invention to provide a mop washing bucket that enhances the ability to effectively mop the floor.

It is still a further object of the present invention to provide a mop washing bucket which conserves water.

It is still a further object of the present invention to provide a mop washing bucket that avoids the use of wheels and wringing apparatus.

It is still a further object of the present invention to provide a mop washing bucket that is easy-to-use, relatively inexpensive and easy to manufacture.

It is still a further object of the present invention to provide a mop washing bucket which allows debris and dirty water to be directed to a specific location exterior of the washing bucket.

These and other objects and advantages of the present invention will become apparent from a reading of the attached specification and appended claims.

BRIEF SUMMARY OF THE INVENTION

The present invention is a mop washing bucket that comprises a container having an interior volume defined by a bottom and the wall extending upwardly from the bottom, a fluid inlet affixed adjacent to the bottom of the container, and a fluid outlet formed on the container in a location above the fluid inlet. The fluid inlet is adapted to be connected to a water hose. The fluid inlet extends through the wall of the container so as to have one end in the interior volume and another end exterior of the wall of the container. A fluid outlet is adapted to allow water from the interior volume of the container to flow outwardly of the container.

The wall of the container has a pair of side walls and a pair of end walls extending between the pair of side walls so as to have a generally rectangular configuration. Each of the pair of side walls has a length dimension extending between the pair of end walls. Each of the pair of end walls has a length dimension extending between the pair of side walls. The length dimension of each of the pair of side walls is greater than a length dimension of each of the pair of end walls.

The fluid inlet comprises a fitting affixed in one of the pair of end walls. The fitting has a hose fitting on an end exterior of the end wall and a nozzle on the end of the fitting in the interior volume of the container. The nozzle of the fitting is a slot having a length dimension extending parallel to the bottom of the container and a width dimension extending transverse to the bottom of the container. The length dimension of the slot is substantially greater than the width dimension of the slot. The width dimension of the slot is greatest between the opposite ends of the length dimension of the slot. In the preferred embodiment the present invention, the slot has a truncated ellipsoid shape.

The fluid outlet comprises an opening formed in the wall of the container. In particular, in the preferred embodiment of the present invention, the fluid outlet is a tubular member extending outwardly of the hole of the wall of the container. The tubular member is adapted to allow water to flow outwardly from the container at a location spaced away from the wall of the container. In the preferred embodiment of the present invention, the tubular member has ridges thereon. These ridges are adapted to retain a conduit or hose over an end of the tubular member.

In an embodiment of the present invention, the fluid inlet and the fluid outlet will be on a common wall of the container. A pair of feet are affixed to the bottom of the container so as to extend outwardly from the bottom of the container. The plurality of feet are adapted to support the container in spaced relation above an underlying surface. A water hose can be connected to the fluid inlet. The fluid inlet defines a nozzle that directs water under pressure from the water hose into the interior volume of the container in a bottom-to-top circular pattern.

In an other embodiment of the present invention, the fluid outlet comprises a pipe affixed to the wall of the container. The pipe has an end extending outwardly of the wall of the container. This pipe can have an L-shaped configuration. In particular, the pipe can be pivotally mounted to the container such that an end of the pipe can be directed in a desired direction.

This foregoing Section is intended to describe, with particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
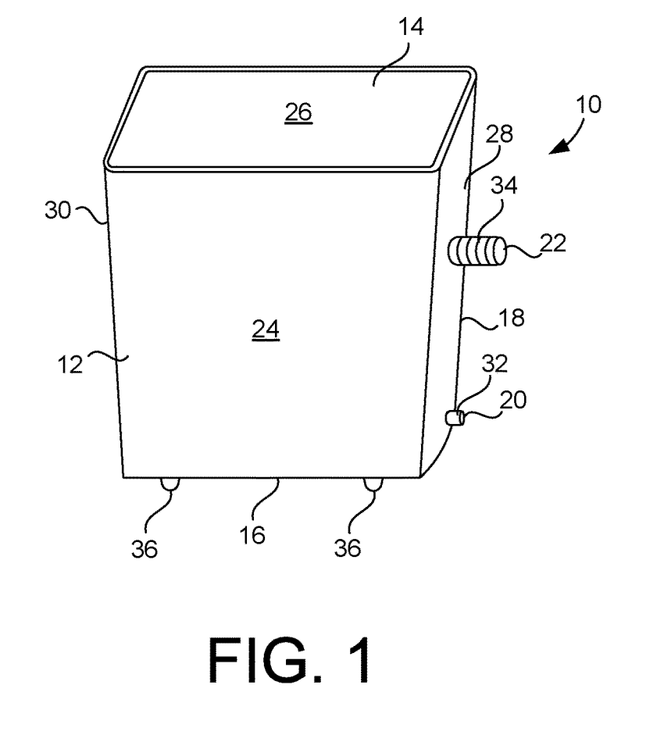
FIG. 1 is an upper perspective view of the mop washing bucket of the preferred embodiment of the present invention.

Referring to FIG. 1, there is shown the mop washing bucket 10 in accordance with the preferred embodiment of the present invention. The mop washing bucket 10 includes a container 12 having an interior volume 14 defined by a bottom 16 and a wall 18 extending upwardly from the bottom 16. A fluid inlet 20 is affixed to the wall 18 adjacent to the bottom 16 of the container 12. The fluid inlet 20 is adapted be connected to a water hose. The fluid inlet 20 extends through the wall 18 of the container so as to have one end in the interior volume 14 and another end exterior of the wall 18 of the container 12. A fluid outlet 22 is formed on the container 12 in a location above the fluid inlet 20. The fluid outlet is adapted to allow water from the interior volume 14 of the container 12 to flow outwardly of the container 12.

As can be seen in FIG. 1, the wall 18 of the container 12 has a pair of side walls 24 and 26 and a pair of end walls 28 and 30 extending between the pair of side walls 24 and 26. It can be seen that the container 12 has a generally rectangular configuration. This rectangular configuration is important to the proper operation of the present invention as will be described hereinafter. In other words, the rectangular configuration will cause the flow pattern of water that is introduced through the fluid inlet 20 to have a bottom-to-top circular flow pattern for the aggressive and effective cleaning of materials introduced into the interior of the mop washing bucket 10. If the container 12 was circular, the water would flow in a cyclonic pattern. The cyclonic pattern is effective for the cleaning of mop strings, but less effective in the cleaning of micro-fiber pads.

In particular, it can be seen that the sidewalls 24 and 26 have a length dimension extending between the pair of end walls 28 and 30. Each of the pair of end walls 28 and 30 has a length dimension extending between the pair of side walls 24 and 26. The length dimension of each of the pair of side walls 24 and 26 is greater than a length dimension of each of the pair of end walls 28 and 30.

The fluid inlet (as will be described hereinafter) is a fitting that is affixed to the end wall 28. The fitting 20 will have a portion 32 on an exterior of the end wall 28 and will have a nozzle (to be described hereinafter) in the interior volume 14 of the container 12. The configuration of the fluid inlet 20 is described in greater detail herein in FIG. 5.

The fluid outlet 22 is an opening that is formed in the wall 28 of the container 12. In particular, the fluid outlet 22 includes a tubular member 34 that extends outwardly of the hole in the wall 28 of the container 12. The tubular member 34 is adapted to allow water to flow outwardly of the container in a location spaced away from the wall 28 of the container. If only a hole were placed into the wall 28 of the container, then the water would tend to drain down the end wall 28 of the container in an unsightly fashion. After the container is removed from the drain, then water that resides on the end wall 28 will continue to drip during use during the mopping process. As such, the tubular member 34 is adapted so as to allow water to be released from the interior 14 of the container 12 in a location spaced away from the wall 18 of the container 12. As such, the exterior of the walls of the container will be generally free of moisture and water accumulation thereon.

It can be seen that the tubular member 34 has ridges formed thereon. These ridges are adapted to retain a conduit over an end of the tubular member. As such, if it is desired to place a hose or conduit around the tubular member 34 in order that the discharge of water from the interior volume 14 of the container 12 to be passed to a remote location, then the ridges on the tubular member 34 will accommodate the placement of such a hose or conduit. This is particularly effective if a drain is located far away from the placement of the mop washing bucket 10. It can be seen that the fluid inlet 20 and the fluid outlet 22 are on a common wall 24 of the container.

A plurality of feet 36 are affixed to the bottom 16 of the container 12 so as to extend outwardly from the bottom 16 of the container 12. The plurality of feet 36 can be simple plastic feet that are intended to support the container 12 in spaced relation above an underlying surface.

Figure 2:
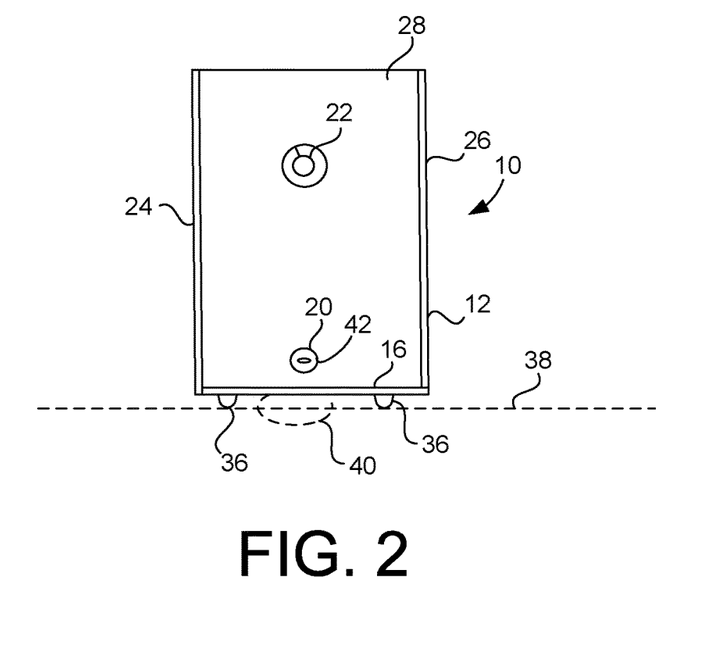
FIG. 2 is an end elevational view showing the placement of the mop washing bucket of the present invention upon an underlying surface.

FIG. 2 shows the placement of the mop washing bucket 10 of the present invention upon an underlying surface 38. In particular, the underlying surface 38 has a drain 40 thereon. The feet 36 of the mop washing bucket 10 support the bottom 16 of the container 12 in spaced relation above the underlying surface 38. As such, when water is discharged through the fluid outlet 22, it will be discharged toward the underlying surface 38 and will migrate, eventually, toward the drain 40. Since the feet 36 serve to space the bottom 16 away from the underlying surface 38, the bottom 16 will not block the drain 40 nor create an impediment to the proper flow of water toward the drain 30.

In FIG. 2, it can be seen that the fluid inlet 20 has a nozzle 42 on the interior 14 of the container 12. This nozzle be described in greater detail hereinafter. FIG. 2 also shows that the end wall 28 has a dimension between the sidewalls 24 and 26 which is less than the length of the side walls 24 and 26 between the end walls 28 and 30.

Figure 3:
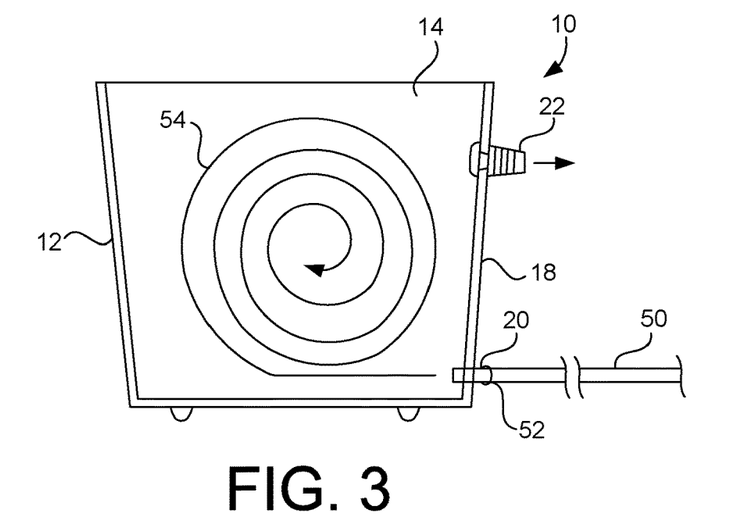
FIG. 3 is a cross-sectional view of the mop washing bucket of the present invention showing the bottom-to-top circulation pattern of water within the interior of the bucket.

FIG. 3 shows the mop washing bucket 10 having a water hose 50 affixed to the fluid inlet 20. The end of the fluid inlet 20 will have a hose fitting 52 on the end extending outwardly of the wall 18 of the mop washing bucket 10. The hose 50 will deliver water into the interior volume 14 of the container 12 in the manner shown in FIG. 3. The nozzle at the end of the fluid inlet 20 will create a bottom-to-top flow pattern in a circular manner as shown by line 54. This continuous circular flow pattern will cause any materials within the water in the interior volume 14 of the container 12 to circulate upwardly and then downwardly and continuously. This creates a unique washing operation that is particularly adapted to the cleaning of microfiber pads. When a large number of microfiber pads are placed within the circulating water in the interior volume of the container 12, they will continue only rotate and be agitated by this circular bottom-to-top spiral or circular flow pattern. They will continue to move upwardly and downwardly as water is being discharged out of the fluid outlet 22. As such, continuous clean water will be introduced from the water hose 50 into the interior volume 14. As dirt and debris tend to accumulate within the water in the container 14, the dirt and debris will ultimately be discharged, along with the water, outwardly of the fluid outlet 22 as illustrated by the arrow adjacent thereto. As such, the microfiber pads or mop strings will always be subjected to hot clean water during the washing process. Experiments conducted with the present invention have found that this bottom-to-top circular flow pattern greatly improves the efficiency of the cleaning of microfiber pads in an unexpected manner. It is believed that the upward motion and then the downward motion and then the upward motion of such microfiber pads tended to cause more water to be forced through each of the pores of the microfiber pad. As such, this enhances the cleaning process.

Figure 4:
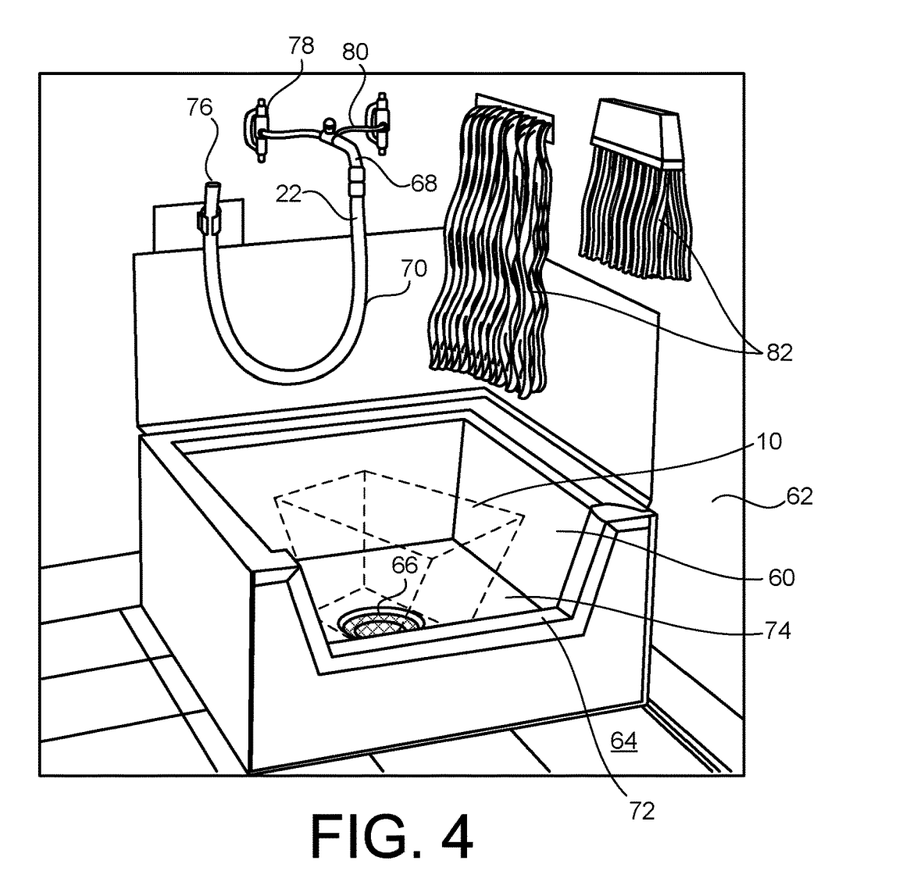
FIG. 4 is a perspective view showing the placement of the mop washing bucket of the present invention within a sink or drainage area in a janitorial closet.

FIG. 4 shows the mop washing bucket 10 in a broken-line fashion is placed within a sink 60 in a janitorial closet 62. Sink 60 can be in the nature of a drain fixture or it can be a sink that is supported a distance above the floor 64. A drain 66 is centrally placed within the sink 60. A water supply 68, along with a hose 70, is provided adjacent to the sink 60 in the janitorial closet 62.

Ultimately, in the process of the present invention, the mop washing bucket 10 can simply be lifted over the edge 72 and placed on the floor 74 of the sink 60. Since the feet 36 support the bottom 16 of the container 12 a distance below the underlying surface, there is no problem with placing the mop washing bucket 10 directly over the drain 66. Ultimately, the hose 70 can be moved so that the end 76 can be joined to the hose fitting 52 on the fluid inlet 20. The hot water knob 78 on faucet 80 can be turned so that hot water is delivered through the hose 70 and ultimately into the interior volume of the mop washing bucket 10. The microfiber pads and/or mop strings 82 can then be lowered into the mop washing bucket 10 for continuous cleaning.

In normal use, a mop, such as mop 82, will be introduced through the opening at the top of the container 12 and inserted into the water within the container 12. The strings of the mop 82 will absorb water. Since the water hose 70 is connected to the faucet 80, hot water from the faucet 80 can be delivered through the hose 70 continuously into the interior of the container 12. As such, the mop strings will have hot water thereon. The mop can then be used to mop a floor. After a certain amount of time, the mop strings will be reintroduced through the opening at the top of the container 12 and back into the water of the container. The hot water within the container 12 will serve to separate grease and other debris from the strings of the mop. Often, the mop strings are placed against the bottom 16 of the container 12 so as to squeeze the contaminants therefrom. Since the nozzle of the fluid inlet 20 is directed generally adjacent to the bottom 16 of the container, a jet of water is provided so as to further assist in removing contaminants from the mop strings.

Ultimately, the grease and debris that has been discharged from the mop into the water in the container 12 will continue to rise within the water in the container as the water continues to be introduced into the container 12 from the water hose 70 through the fluid inlet 20. Since water is continuously discharged through the fluid outlet 22, the debris will ultimately rise with the water until the contaminants reach the fluid outlet 22. These contaminants and debris can then be discharged through the fluid outlet 22 and outwardly to a drain.

Under all circumstances, the water that remains within the container 12 will continue to be clean and hot. This will continue throughout the various cycles of wringing the mop within the container 12. If a wringer is used to squeeze the mop strings, the debris will be deposited adjacent the top level of water within the container 12 so that it will more quickly flow out of the fluid outlet 22. After the mop has been squeezed in a wringer, the debris is released therefrom and quickly discharged through the fluid outlet. The mop is then reinserted in the clean water within the interior of the container 12.

Importantly, in the present invention, the container 12 will have a relatively small size. This is very important for small establishments, such as fast food locations, convenience stores, and other small facilities. The relatively large mop buckets are not necessary. Since only a small amount of area needs to be mopped, the present invention avoids the needs for wringing apparatus and wheeled structures. The present invention is intended to take up the space of a relatively small wastebasket. As such, it can be easily moved and stowed. Ultimately, the the container will receive much less water. As such, the weight of the container, with the water therein, is relatively minimal. This container can be handled by a single individual by simply lifting the container and the water therein and moving the container and its water to the drain. As such, the present invention can be provided at a much lower cost, can be transported much more easily, and can be stored within the small facility in a minimal amount of space. This is accomplished while, at the same time, providing extremely effective cleaning action to mop strings and in particular, microfiber pads.

Figure 5:
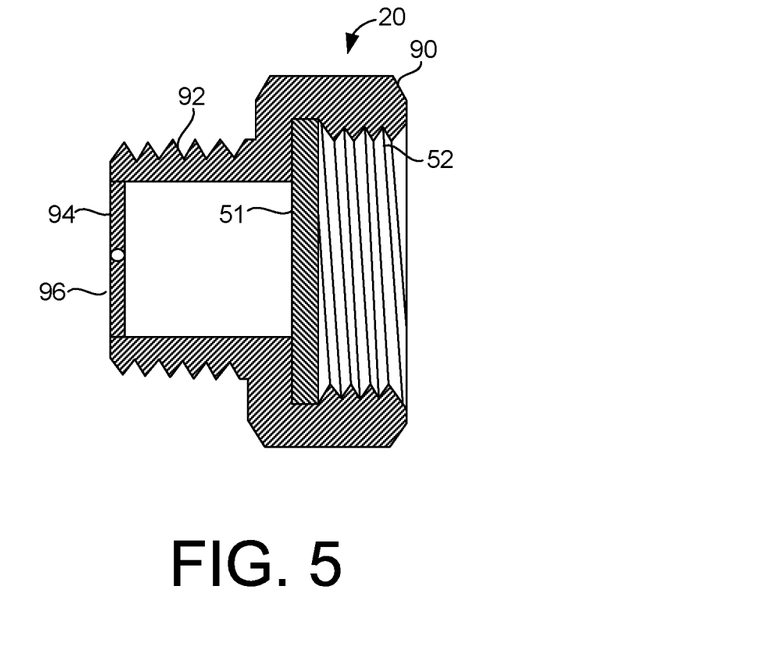
FIG. 5 is a cross-sectional view of the fluid inlet of the preferred embodiment of the present invention.

FIG. 5 shows the fluid inlet 20 as used in the present invention. It can be seen that the fluid inlet 20 has the hose fitting 52 at the end 90 that will extend outwardly of the wall 18 of the container 12. Ultimately, the threaded portion 92 can engage with the wall of the container in a liquid-tight manner. Alternatively, the wall 18 of the container 12 can be simply molded to the surfaces of the fluid outlet 12. The end 94 of the fluid outlet 20 includes a nozzle having a small aperture 96 therein. The small aperture is illustrated, in greater detail in FIG. 6. The fluid outlet 20 can further have a water reducer 51. The water reducer 51 is a generally flat disk of an elastomeric material. There is a hole that is formed through the water reducer 51. Ultimately, when the water hose is connected to the threads of the hose connector 52 of the fluid outlet 20, the pressure rise of the water flow from the water hose will flow through the interior passageway toward the water reducer 51. The only water that will flow past the water reducer 51 will be that water which passes through the hole of the water reducer 51. As such, the water reducer 51 serves to reduce the rate of water flow into the interior 18 of the container 12. The water reducer 51 assures that no matter how much pressure is directed by the water hose toward the container 12, only a limited amount of water will be released into the interior 18 of the container 12.

Figure 6:
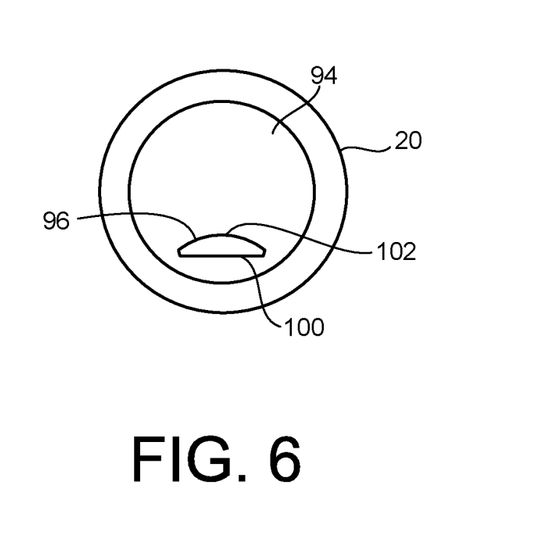
FIG. 6 is an end view of the fluid inlet of the preferred embodiment of the present invention.

FIG. 6 shows, in particular, the nozzle 96 that is formed at the end 94 of the fluid inlet 20. The nozzle 96 has a slot having a length dimension 100 extending parallel to the bottom 16 of the container 12 and a width dimension extending transverse to the bottom 16 of the container 12. It can be seen that the length dimension 100 of the slot is substantially greater than the width dimension of the slot. The nozzle 96 has its width dimension greater in the center 102 between the opposite ends of the length dimension 100 of the slot. The slot has a truncated ellipsoid shape.

The nozzle 96 is adapted to direct a pressurized flow of water toward an area adjacent to the bottom 16 of the container 12. It can be seen that the nozzle 96 has the shape of a cord of a circle. The straight edge 100 of the cord of the circle is below the curved portion 102. Experiments with this configuration of nozzle have shown that it creates a strong laminar flow of water in a straight direction adjacent to the bottom 16 of the container 12. The curved portion 102 of the nozzle 96 creates a strong flow that tends to spread slightly upwardly from the bottom 16 of the container 12. As such, these flows of water tend interact with the strings of the mop or with the surfaces of the microfiber pads so as to forcibly remove debris from the strings or from the pores of the microfiber pad. This configuration of slot also creates the bottom-to-top flow pattern of water within the interior 18 of the container 12.

Figure 7:
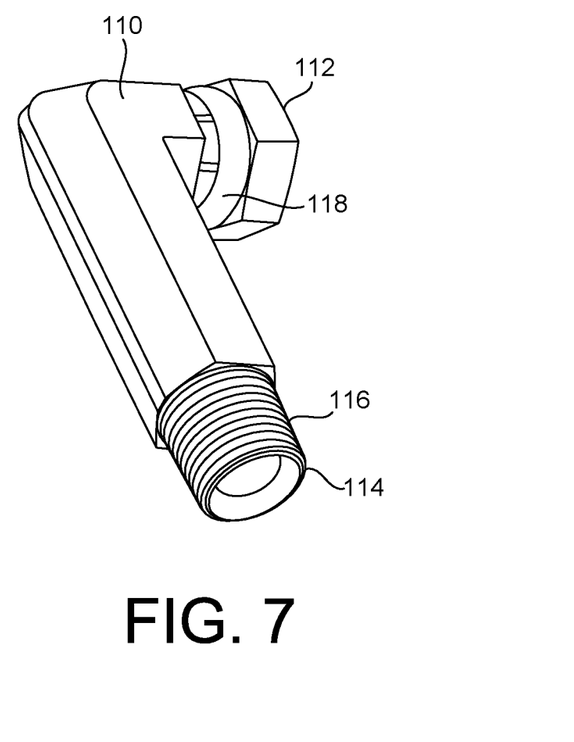
FIG. 7 is a perspective view of an alternative embodiment of the fluid outlet of the present invention.

FIG. 7 shows one configuration of a pipe 110 that can be used with the fluid outlet 22 of the present invention. FIG. 7 shows a swivel pipe 110 having one end 112 that can be affixed to the fluid outlet 22 and an opposite end 114 that has threads 116 suitable for securing to a conduit. The elbow swivel 110, as shown in FIG. 7, can be movable about pivot joint 118 between a first position extending upwardly and a second position extending downwardly. When the elbow swivel 110 is in the downward position, it is suitable for delivering water flowing from the interior 18 of the container 12 toward an underlying surface. On the other hand, when the elbow swivel 110 is in the upper position (to which the end 114 is located above the swivel joint 118), it will allow the mop washing bucket 10 to be used as a conventional bucket. In other words, if a cap were placed over the fluid inlet 20 so as to close the fluid inlet, a continuous supply of water is not being delivered into the interior 18 of the container 12. Since the elbow swivel 110 has its end 118 above the level of water within the bucket, the water will pass outwardly of the end 28. As such, this easily allows one to convert the continuous-flow washing bucket 10 of the present invention into a conventional mop bucket.

The foregoing disclosure and description of the invention is illustrative and explanatory thereof. Various changes in the details of the illustrated construction can be made is the scope of the appended claims without departing from the true spirit of the invention. The present invention should only be limited by the following claims and their legal equivalents.

I claim:

1. A mop washing bucket comprising:
   a container having an interior volume defined by a bottom and a pair of side walls and a pair of end walls extending between the pair of side walls so as to have a rectangular configuration, the pair of side walls and the pair of end walls extending upwardly from the bottom;
   fitting affixed adjacent the bottom of said container, said fitting adapted to be connected to a water hose, said fitting affixed in one of the pair of end walls and extending through the one of the pair of end walls so as to have one end in the interior volume of said container and another end exterior of the wall of said container, said fitting having a hose connector on an end exterior of the one of pair of end walls and a nozzle at the one end of said fitting in the interior volume of said container, the nozzle of said fitting having a slot with a length dimension extending parallel to the bottom of said container and a width dimension extending transverse to the bottom of said container, the length dimension of said slot being greater than the width dimension of said slot, the width dimension of the slot being greatest between opposite ends of the length dimension of the slot; and
   a fluid outlet formed on said container in a location above the fitting, said fluid outlet adapted to allow water in the interior volume of said container to flow outwardly of said container.

2. The mop washing bucket of claim 1, each of said pair of side walls having a length dimension extending between the pair of end walls, each of said pair of end walls having a length dimension extending, between the pair of side walls, the length dimension of each of the pair of side walls being greater than the length dimension of each of the pair of end walls.

3. The mop washing bucket of claim 1, said slot having a truncated ellipsoid shape.

4. The mop washing bucket of claim 1, said fluid outlet comprising an opening formed in the at least one of the pair of side walls and the pair of end walls of said container.

5. The mop washing bucket of claim 4, said fluid outlet having a tubular member extending outwardly of the opening in the at least one of the pair of side walls and the pair of end walls of said container, the tubular member adapted to allow water to flow outwardly of said container to a location spaced away from the at least one of the pair of side walls and the pair of end walls of said container.

6. The mop washing bucket of claim 1, said fitting and said fluid outlet being on a common wall of said container.

7. The mop washing bucket of claim 1, further comprising:
a pair of feet affixed to the bottom of said container so as to extend outwardly from the bottom of said container, said pair of feet adapted to support said container in spaced relation above an underlying surface.

8. A mop washing bucket comprising:
a container having an interior volume defined by a bottom and a pair of side walls and a pair of end walls extending between the pair of side walls so as to have a rectangular configuration, the pair of side walls and the pair of end walls extending upwardly from the bottom;
fitting affixed adjacent the bottom of said container, said fitting adapted to be connected to a water hose, said fitting affixed in one of the pair of end walls and extending through the one of the pair of end walls so as to have one end in the interior volume of said container and another end exterior of the wall of said container, said fitting having a hose connector on an end exterior of the one of pair of end walls and a nozzle at the one end of said fitting in the interior volume of said container, the nozzle of said fitting having a slot with a length dimension extending parallel to the bottom of said container and a width dimension extending transverse to the bottom of said container;
a fluid outlet formed on said container in a location above the fitting, said fluid outlet adapted to allow water in the interior volume of said container to flow outwardly of said container; and
a water hose connected to said fitting, said fitting defining a nozzle that directs water under pressure from said water hose into the interior volume of said container in a bottom-to-top circular pattern.

9. The mop washing bucket of claim 1, said fluid outlet comprising:
a pipe affixed to one of the pair of side walls and pair of end walls of said container, said pipe having an end extending outwardly of the one of the pair of side walls and pair of end walls of said container.

10. The mop washing bucket of claim 9, said pipe having an L-shape.

11. The mop washing bucket of claim 10, said pipe being pivotally mounted to said container such that an end of said pipe can be directed in a desired direction.

12. A mop washing bucket comprising:
a container having an interior volume defined by a bottom and a wall extending upwardly from the bottom;
a fluid inlet affixed adjacent the bottom of said container, said fluid inlet extending through the wall of said container so as to have one end in the interior volume of said container and another end extending exterior of the wall of said container;
a fluid outlet formed on said container in a location above said fluid inlet, said fluid outlet adapted to allow water from the interior volume of said container to flow outwardly of said container; and
a water hose connected to said fluid inlet, said fluid inlet defining a nozzle that directs water under pressure from said water hose into the interior volume of said container in a bottom-to-top circular pattern.

13. The mop washing bucket of claim 12, said fluid inlet comprising:
a fitting affixed to the wall of said container, said fitting having a hose fitting on an end exterior of the wall of said container and a nozzle on the end of the fitting in the interior volume of said container.

14. The mop washing bucket of claim 12, the nozzle of said fitting being a slot having a length dimension extending parallel to the bottom of said container and a width dimension extending transverse to the bottom of said container, the length dimension of the slot being greater than the width dimension of the slot.

15. The mop washing bucket of claim 12, said wall of said container having a pair of side walls and a pair of and walls extending between said pair of side walls so as to define a rectangular configuration.

\* \* \* \* \*